(12) United States Patent
Yuan (10) Patent No.: US 8,203,829 B2
(45) Date of Patent: Jun. 19, 2012

(54) BATTERY COVER ASSEMBLY AND ELECTRONIC DEVICE UTILIZING THE SAME

(75) Inventor: Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 248 days.

(21) Appl. No.: 12/756,986

(22) Filed: Apr. 8, 2010

(65) Prior Publication Data

US 2011/0170242 A1    Jul. 14, 2011

(30) Foreign Application Priority Data

Jan. 9, 2010  (CN) .......................... 2010 1 0300155

(51) Int. Cl.
*H05K 7/12* (2006.01)

(52) U.S. Cl. ................ 361/679.01; 361/727; 455/575.4; 429/96

(58) Field of Classification Search ............. 361/679.01, 361/679.02, 679.55, 679.56, 724–727; 455/575.1–575.4; 429/96, 97, 100
See application file for complete search history.

(56) References Cited

U.S. PATENT DOCUMENTS 7,512,397 B2 * 3/2009 Liu et al. ........................ 455/347
2010/0160009 A1 * 6/2010 Tang ........................... 455/575.4

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

The present disclosure discloses a battery cover assembly for use in an electronic device. The battery cover assembly includes a housing and a cover. The housing includes a compartment couples to the cover. At least one elastic member is fixed to the back wall of the compartment. A plurality of grooves, and a plurality of receiving spaces formed in the two side walls communicating with the compartment. Each groove communicates with one receiving space. A first connecting plate and a second connecting plate movably connected to the base, each of the first connecting plate and the second connecting plate comprises at least one protruding post slidably received in the grooves, which connects the base to the housing. A first elastic connecting member are connected to the first connecting plate and the knob. A second elastic connecting member are connected to the second connecting plate and the knob.

20 Claims, 7 Drawing Sheets

BATTERY COVER ASSEMBLY AND ELECTRONIC DEVICE UTILIZING THE SAME

BACKGROUND

1. Technical Field

The disclosure relates to a battery cover assembly and an electronic device utilizing the battery cover assembly.

2. Description of the Related Art

Generally, portable electronic devices, such as mobile phones, e-readers, laptop computers, and the like, include a back cover. To remove a battery or a memory card retained within the electronic device, the back cover should first be removed. However, it often happens that the covers fit with the device bodies so tightly that they are very difficult to remove when needed. Parts of the device may be damaged in the struggle to remove the cover. Therefore, a new type of cover assembly is desired to overcome the above-mentioned shortcomings.

BRIEF DESCRIPTION OF THE DRAWINGS

The components in the drawings are not necessarily drawn to scale, the emphasis instead being placed upon clearly illustrating the principles of the battery cover assembly for use in an electronic device. Moreover, in the drawings, like reference numerals designate corresponding parts throughout the several views.

DETAILED DESCRIPTION

Figure 1:
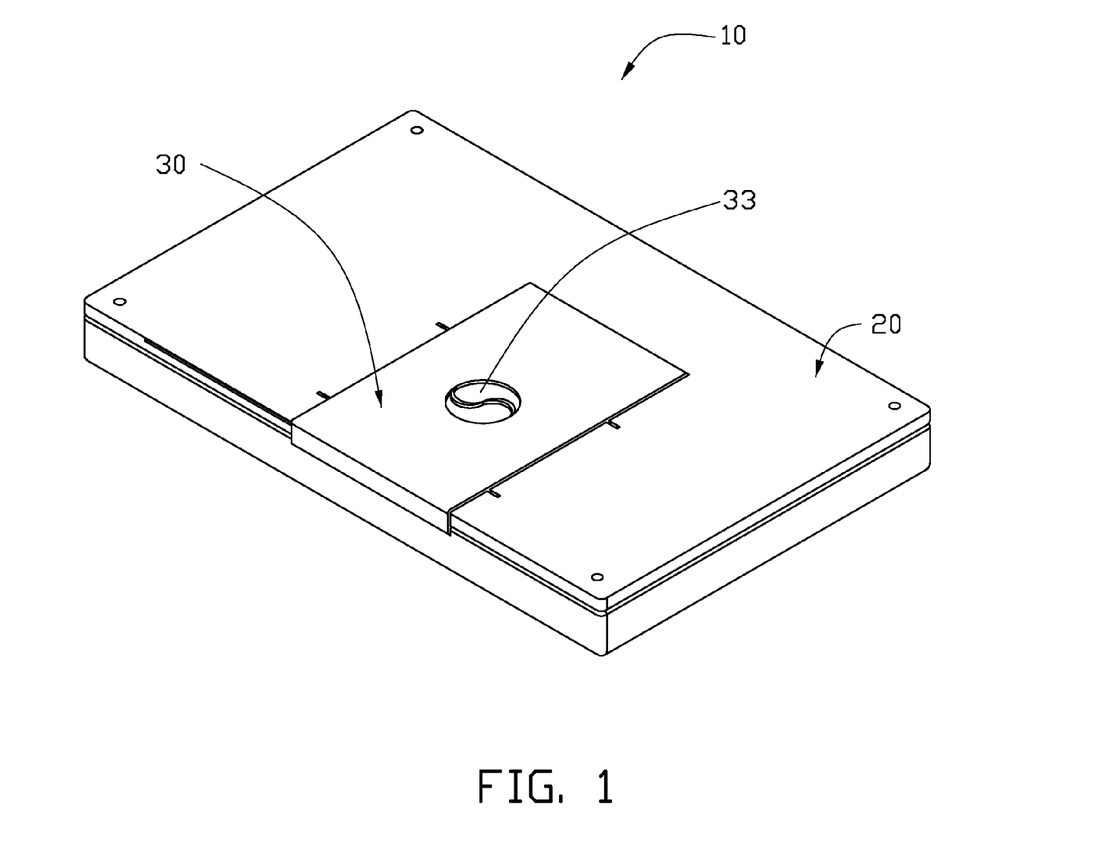
FIG. 1 is an isometric view of a battery cover assembly in accordance with an exemplary embodiment.
Figure 2:
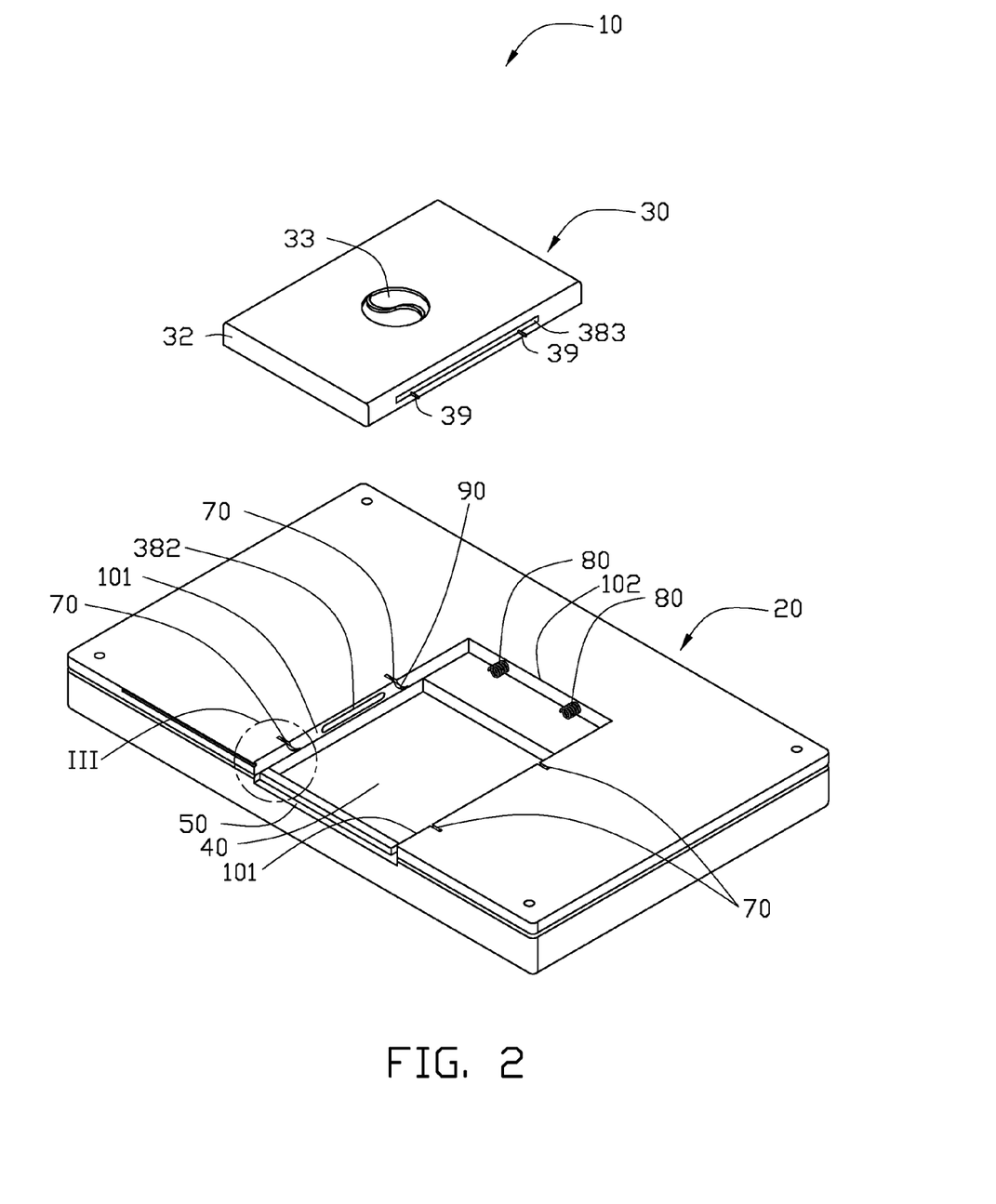
FIG. 2 is an exploded perspective view of the battery cover assembly of FIG. 1.

Referring to FIGS. 1-2, a battery cover assembly 10 for an electronic device includes a housing 20, a battery cover 30, a pair of elastic members 80, and a knob 33. The electronic device can be a mobile phone, an e-reader, a PDA, a notebook computer, and the like.

As shown in FIG. 2, a substantially rectangular compartment 40 is defined in the housing 20 for accommodating a battery (not shown). The battery compartment 40 includes a back wall 102, and two side walls 101 that are opposite to each other. The compartment 40 defines an opening 50 opposite to the back wall 102. The pair of spaced elastic members 80 protrudes from the back wall 102. In the exemplary embodiment, the elastic members 80 are coil springs.

Figure 3:
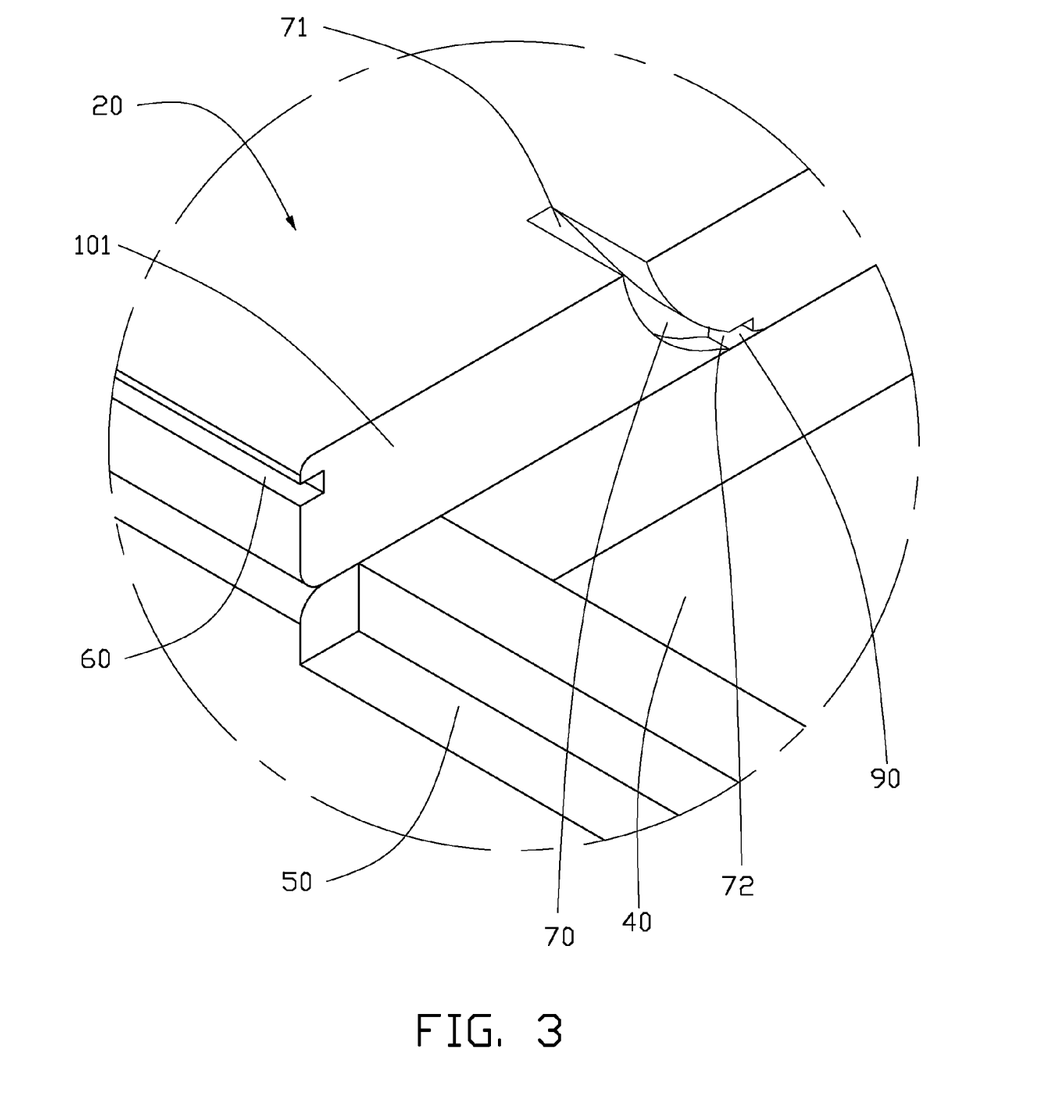
FIG. 3 is an enlarged view of the circled portion III of FIG. 2.
Figure 4:
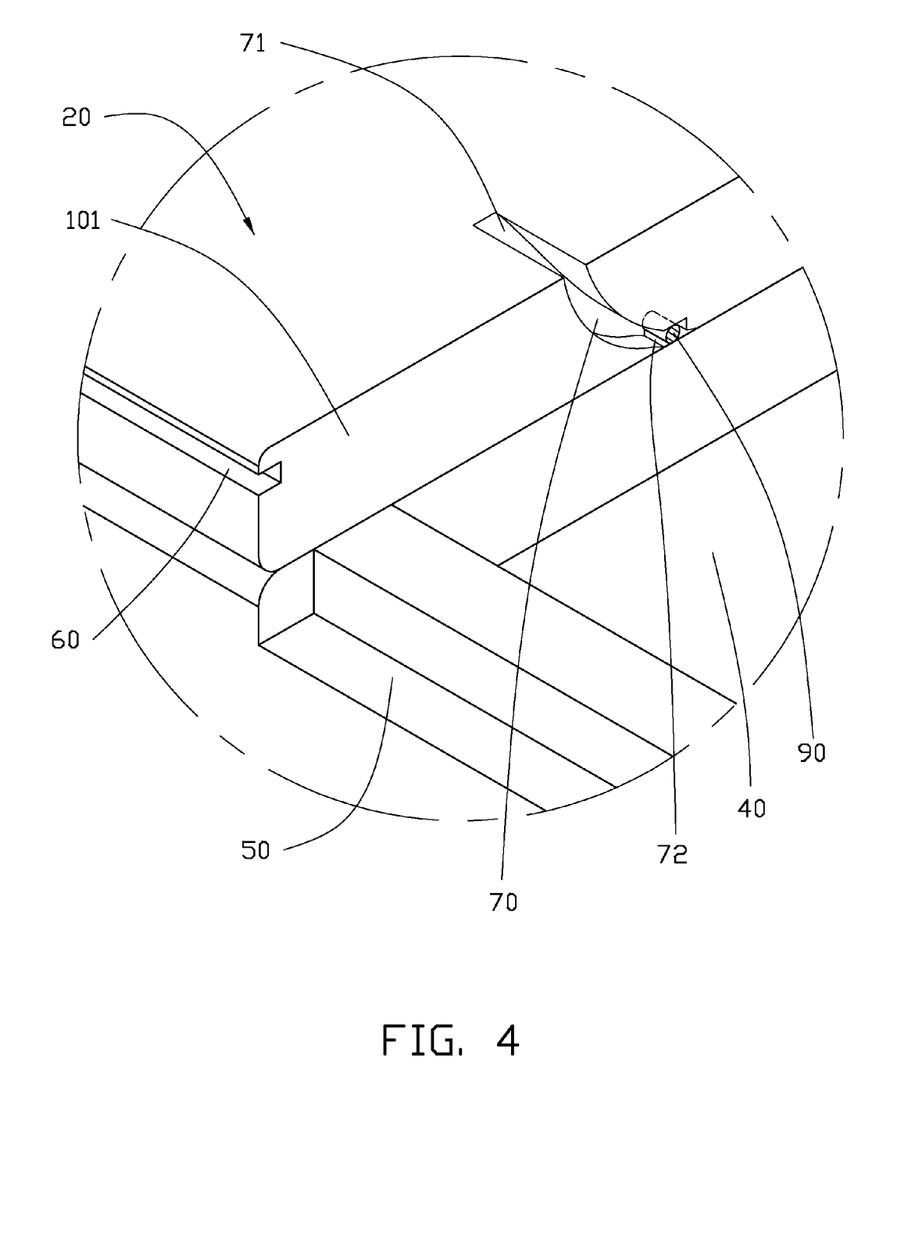
FIG. 4 is a perspective view of FIG. 3, showing a receiving spaces defined in the battery cover assembly.

Referring to FIGS. 3-4, a plurality of open-ended grooves 70 are formed in the side walls 101 and a plurality of receiving spaces 90 are formed in the side walls 101. Each of the grooves 70 extends downwardly in a direction from a back surface of the housing 20 toward the back wall 102. In the exemplary embodiment, each of the grooves 70 is arced, and is generally perpendicular to the side walls 101. A first open end 71 and a second open end 72 are respectively defined in two ends of each of the grooves 70. Each of the plurality of receiving spaces 90 extends perpendicularly to side walls 101 and communicates with one of the grooves 70 through the second open end 72. The depth of the receiving spaces 90 is deeper than that of the grooves 70.

Figure 5:
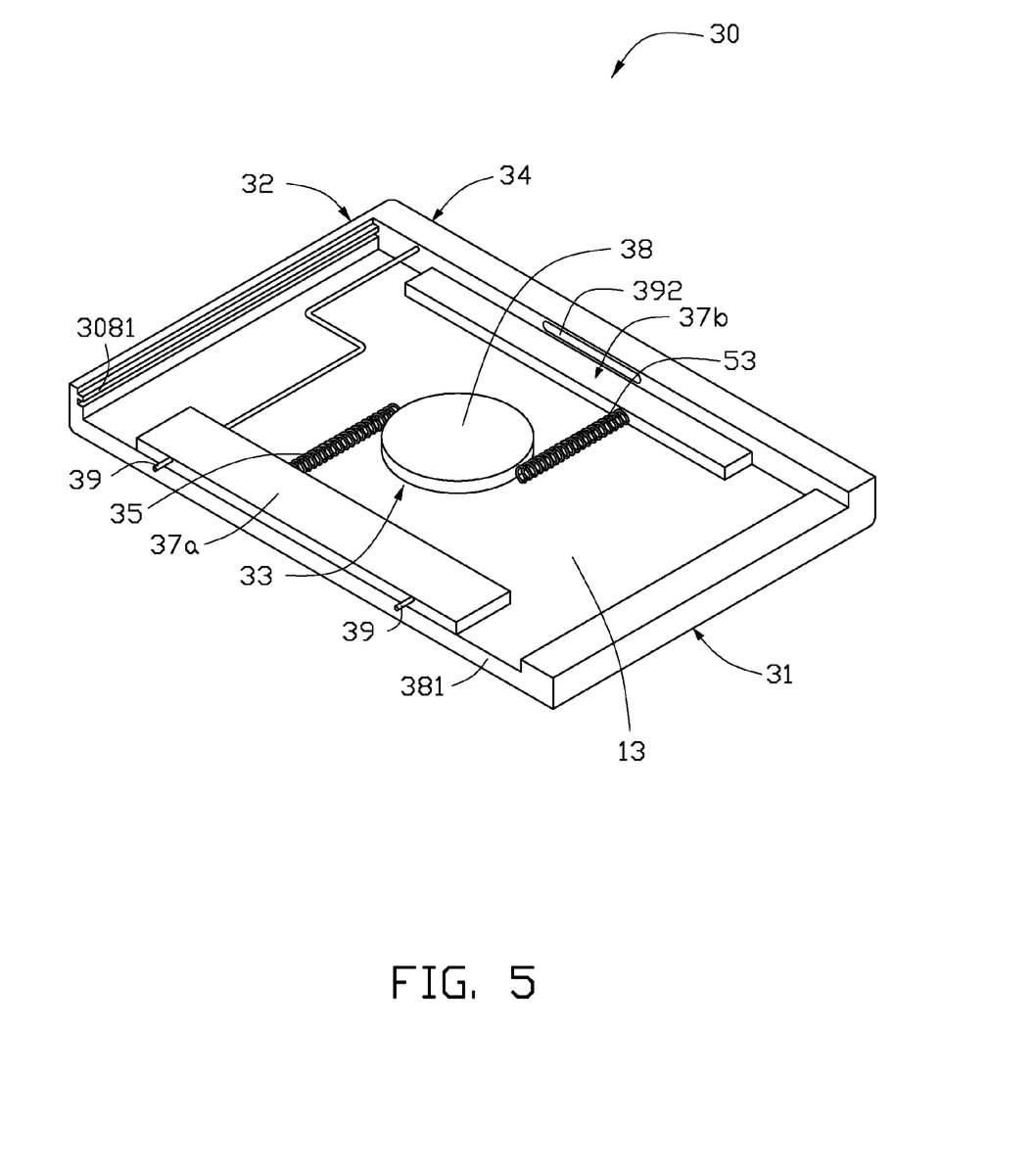
FIG. 5 is an isometric view of a rear cover of the battery cover assembly of FIG. 1.
Figure 6:
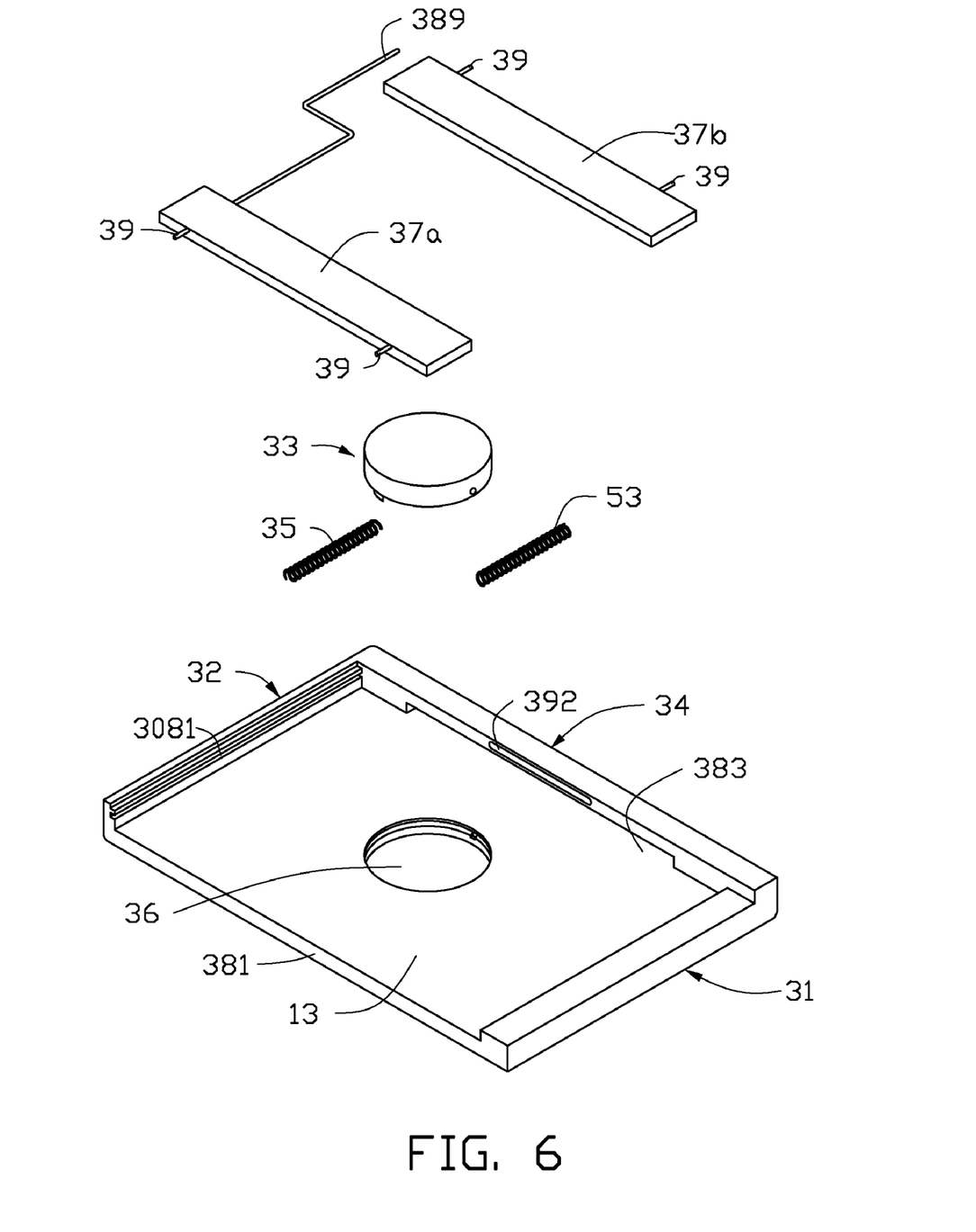
FIG. 6 is an exploded perspective view of the rear cover of FIG. 5.

Referring to FIGS. 5-6, the battery cover 30 includes a base 381, a first wall 31, a second wall 32 opposite to the first wall 31, and an intermediate wall 34. The walls 31, 32, and 34 protrude from the base 381. The base 381, the first wall 31, the second wall 32, and the intermediate wall 34 together define a substantially rectangular space 13. A protruding rail 3081 is formed on an inner surface of the second wall 32. The second wall 32 matches the opening 50 when the cover 30 closes the compartment 40. A central hole 36 is defined in a central portion of the base 381, and a through slot 383 is formed in the intermediate wall 34 adjacent to the base 381.

The battery cover assembly 10 further includes a knob 33, a first elastic connecting member 35, a second elastic connecting member 53, a first connecting plate 37a, a second connecting plate 37b, and a guiding bar 389. The knob 33 is rotatably received in the central hole 36 and one end of the knob 33 protrudes out of an inner surface of the base 381. The first connecting plate 37a and the second connecting plate 37b are movably mounted in the rectangular space 13 of the base 381, and are symmetrically disposed on opposite sides of the knob 33. One end of the second connecting plate 37b is received in the through slot 383. The first elastic connecting member 35 and the second elastic connecting member 53 are parallel to the first wall 31. One end of the knob 33 protruding out of an inner surface of the base 381, one end of the first elastic connecting member 35 and one end of the second elastic connecting member 53 are fixed to two sides of the knob 33. In the exemplary embodiment, the first elastic connecting member 35 and the second elastic connecting member 53 can be coil springs. One end of the guiding bar 389 is movably attached to the first connecting plate 37a, and the other end of the guiding bar 389 is fixed to the inner surface of the intermediate wall 34.

A plurality of protruding posts 39 protrude from one side of the first connecting plate 37a and of the second connecting plate 37b, extending away from the back cover 30. The protruding posts 39 are received in the receiving spaces 90 when the cover 30 is attached to the housing 20. Because the depth of the receiving space 90 is deeper than that of the second open end 71, the protruding posts 39 are retained within the receiving spaces 90.

A sliding groove 60 is formed in a front surface of the housing 20 adjacent to the opening 50. The protruding rail 3081 fits in the sliding groove 60, and enables the battery cover 30 to slide with respect to the housing 20.

A first magnetic member 382 is attached to an inner surface of the side walls 101. A second magnetic member 392 is attached to an inner surface of the intermediate wall 34. The first magnetic member 382 and the second magnetic piece 392 attract each other, which causes the cover 30 to move automatically after the protruding posts 39 disengage from the grooves 70.

During the cover 30 being opened, the knob 33 is firstly rotated by a user. The elastic connecting members 35, 53 are thus driven to be wound onto the knob 33. The first elastic connecting member 35 drags the first connecting piece 37a to move toward the knob 33 and away from the through slot 383, and the second elastic connecting member 53 pulls the second connecting piece 37b to move toward the knob 33 along with the guiding bar 389. The ends of the protruding posts 39 then begin to move out from the receiving spaces 90. Because a repelling force from the elastic member 80 is applied to the battery cover 30, the protruding posts 39 move to the grooves 70 when the ends of the protruding posts 39 pass the second open end 72. The protruding posts 39 then continue moving along the grooves 70 after the knob is rotated to a predetermined position. After the protruding posts 39 move out of the grooves 70 via the first open ends 71, the protruding rail 3081 will align with and move along the sliding groove 60 under the attracting force between the first magnetic members 382 and the second magnetic member 392. The battery cover 30 is thus at an open state and will remain so until acted on by an outside force.

Figure 7:
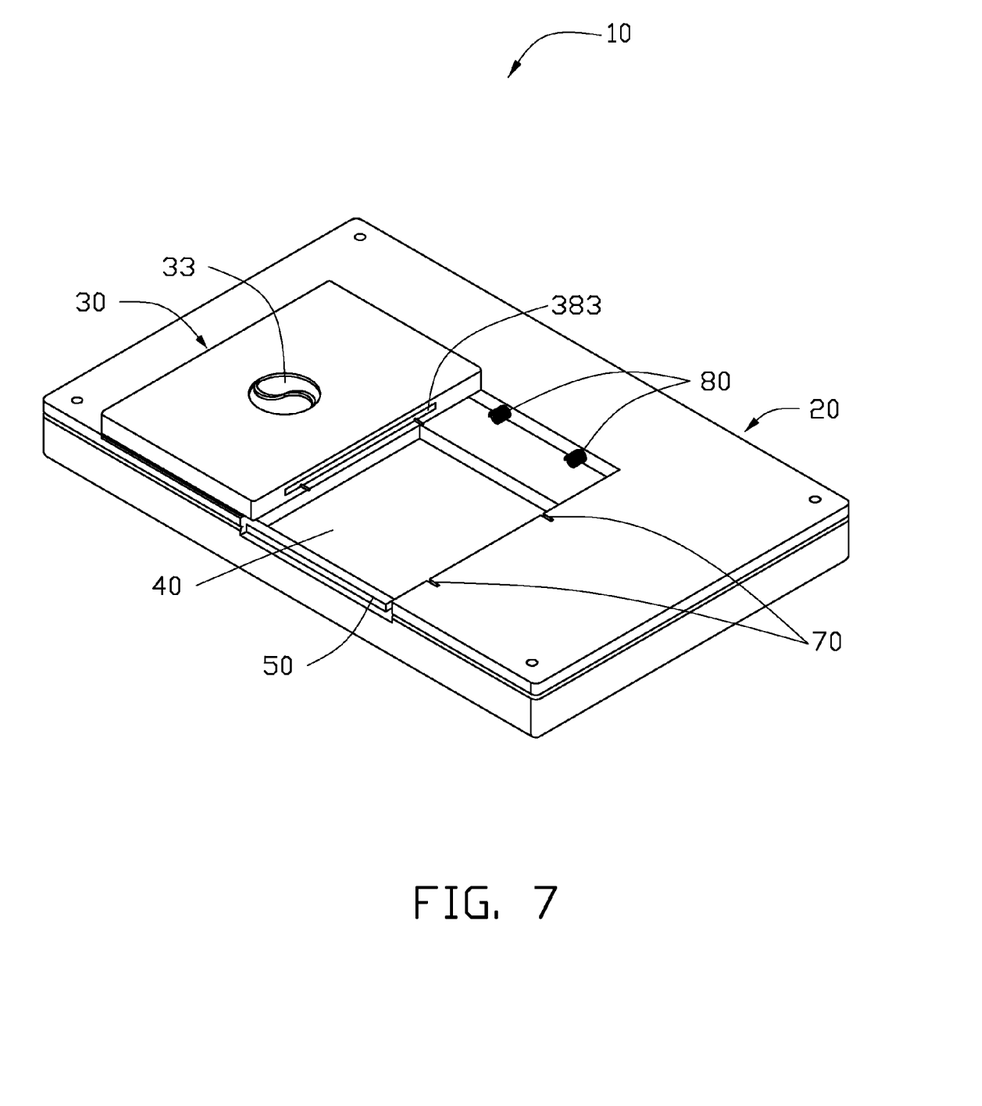
FIG. 7 is an isometric view showing the battery cover open.

Referring to FIG. 7, during closing of the cover 30, the cover 30 is manually pushed to cover the compartment 40 aligning the protruding posts 39 with the first open ends 71. Pressing force is applied to the cover 30 causing the protruding posts 39 to enter the grooves 70 through the first open ends 71, and then enter the receiving spaces 90 via the second open ends 72. At the same time, the elastic members 80 are compressed by the first wall 31 so that the battery cover 30 is pushed out the compartment 40 by the elastic members 80 during the cover 30 being opened. The first elastic connecting member 35 and the second elastic connecting member 53 retain the protruding posts 39 in the receiving spaces 90. The cover 30 thus remains closed until acted on by an outside force.

In another exemplary embodiment, the elastic members 80, the first elastic connecting member 35, and the second elastic connecting member 53 may be made of nonmetallic material such as plastic. Further, the elastic members 80, the first elastic connecting member 35, and the second elastic connecting member 53 may be other type of elastic means known in the art, such as resilient cylinders.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device, comprising:
   a housing comprising a compartment defined therein, the compartment comprising a back wall and two side walls opposite to each other;
   at least one elastic member fixed to the back wall;
   a plurality of grooves and a plurality of receiving spaces formed in the two side walls communicating with the compartment, each groove communicating with one receiving space; and
   a cover comprising:
      a base configured to cover the compartment, and the base operable to elastically compress the at least one elastic member;
      a knob rotatably connected to the base;
      a first connecting plate and a second connecting plate movably connected to the base, wherein each of the first connecting plate and the second connecting plate comprises at least one protruding post capable of being received in one of the plurality of receiving spaces when the cover closes the compartment and moving out of the receiving space via the groove to open the compartment; and
      a first elastic connecting member and a second elastic connecting member, wherein two ends of the first elastic connecting member are connected to the first connecting plate and the knob, two ends of the second elastic connecting member are connected to the second connecting plate and the knob.

2. The electronic device as claimed in claim 1, further comprising a first wall and a second wall opposite to the first wall protruded from the base, and an opening defined in the compartment that is opposite to the back wall, wherein the second wall matches with the opening when the cover closes the compartment.

3. The electronic device as claimed in claim 2, further comprising a sliding groove defined in one side of the housing adjacent to the opening, and a protruding rail formed on an inner surface of the second wall, wherein the protruding rail is capable of sliding in the sliding groove from one end to the other end of the housing.

4. The electronic device as claimed in claim 2, further comprising an intermediate wall formed between the first wall and the second wall, wherein a first magnetic member is attached to an inner surface of one side wall, a second magnetic member is attached to an inner surface of the intermediate wall, the first magnetic member and the second magnetic member attract each other, which causes that the cover moves after the protruding posts disengage from the receiving spaces.

5. The electronic device as claimed in claim 1, wherein one end of the knob protruding out of an inner surface of the base, one end of the first elastic connecting member and one end of the second elastic connecting member are fixed to two sides of the knob.

6. The electronic device as claimed in claim 1, wherein the grooves extend downwardly from a back surface of the housing toward the back wall.

7. The electronic device as claimed in claim 3, further comprising a through slot formed in the intermediate wall, and one end of the second connecting plate is slidably received in the through slot.

8. The electronic device as claimed in claim 7, further comprising a guiding bar, wherein one end of the guiding bar is movably attached to the first connecting plate, and the other end of the guiding bar is fixed to an inner surface of a side wall of the cover.

9. The electronic device as claimed in claim 1, wherein each groove is an arc form.

10. The electronic device as claimed in claim 1, wherein the at least one elastic member is a coil spring.

11. The electronic device as claimed in claim 1, wherein a first open end and a second open end are respectively defined in two ends of each of the grooves; each of the grooves communicates with one receiving spaces through the second open end, and the depth of the receiving space is deeper than that of the second open end.

12. A battery cover assembly for an electronic device, comprising:
   a housing comprising a compartment defined therein, the compartment comprising a back wall and two side walls opposite to each other;
   at least one elastic member fixed to the back wall;
   a plurality of grooves, and a plurality of receiving spaces formed in the two side walls communicating with the compartment, each groove communicating with one receiving space; and
   a cover comprising:
      a base configured to cover the compartment, and the base elastically compressing the at least one elastic member;
      a knob rotatably connected to the base;
      a first connecting plate and a second connecting plate movably connected to the base, wherein each of the first connecting plate and the second connecting plate comprises at least one protruding post capable of being received in one of the plurality of receiving spaces when the cover closes the compartment and moving out of the receiving space via the groove to open the compartment; and a first elastic connecting member and a second elastic connecting member, wherein two ends of the first elastic connecting member are connected to the first connecting plate and the knob, two ends of the second elastic connecting member are connected to the second connecting plate and the knob.

13. The battery cover assembly as claimed in claim 12, further comprising a first wall and a second wall opposite to the first wall protruded from the base, and an opening defined in the compartment that is opposite to the back wall, wherein the second wall matches with the opening as the cover closes the compartment.

14. The battery cover assembly as claimed in claim 13, further comprising a sliding groove defined in one side of the housing adjacent to the opening, and a protruding rail formed on an inner surface of the second wall, wherein the protruding rail is capable of sliding in the sliding groove from one end to the other end of the housing.

15. The battery cover assembly as claimed in claim 13, further comprising an intermediate wall formed between the first wall and the second wall, wherein a first magnetic member is attached to an inner surface of one side wall, a second magnetic member is attached to an inner surface of the intermediate wall, the first magnetic member and the second magnetic member attract each other, which causes that the cover moves after the protruding posts disengage from the receiving spaces.

16. The battery cover assembly as claimed in claim 12, wherein one end of the knob protruding out of an inner surface of the base, the first elastic connecting member and the second elastic connecting member are fixed to two sides of the end of the knob.

17. The battery cover assembly as claimed in claim 14, further comprising a through slot formed in the intermediate wall, and one end of the second connecting plate is slidably received in the through slot.

18. The battery cover assembly as claimed in claim 17, further comprising a guiding bar, wherein one end of the guiding bar is movably attached to the first connecting plate, and the other end of the guiding bar is fixed to an inner surface of a side wall of the cover.

19. The battery cover assembly as claimed in claim 12, wherein a first open end and a second open end are respectively defined in two ends of each of the grooves; each of the grooves communicates with one receiving spaces through the second open end, and the depth of the receiving space is deeper than that of the second open end.

20. The battery cover assembly as claimed in claim 12, wherein the at least one elastic member is a coil spring.

* * * * *